June 6, 1950     W. J. BOWAN ET AL     2,510,494
VALVE
Filed Aug. 20, 1945     3 Sheets-Sheet 2
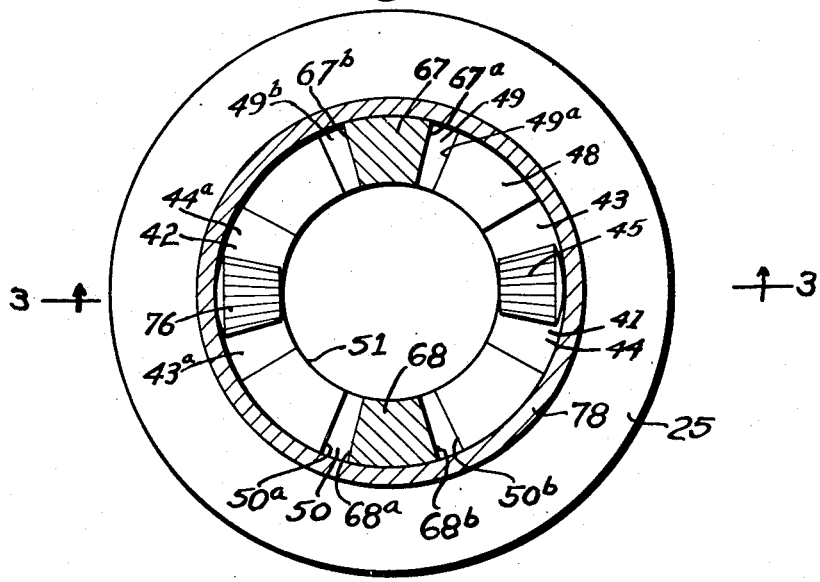
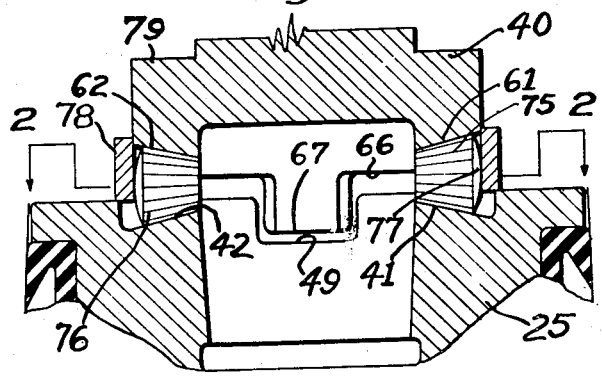
Inventor
Walter J. Bowan
Frederick Tratzik June 6, 1950  W. J. BOWAN ET AL  2,510,494
VALVE Filed Aug. 20, 1945  3 Sheets-Sheet 3

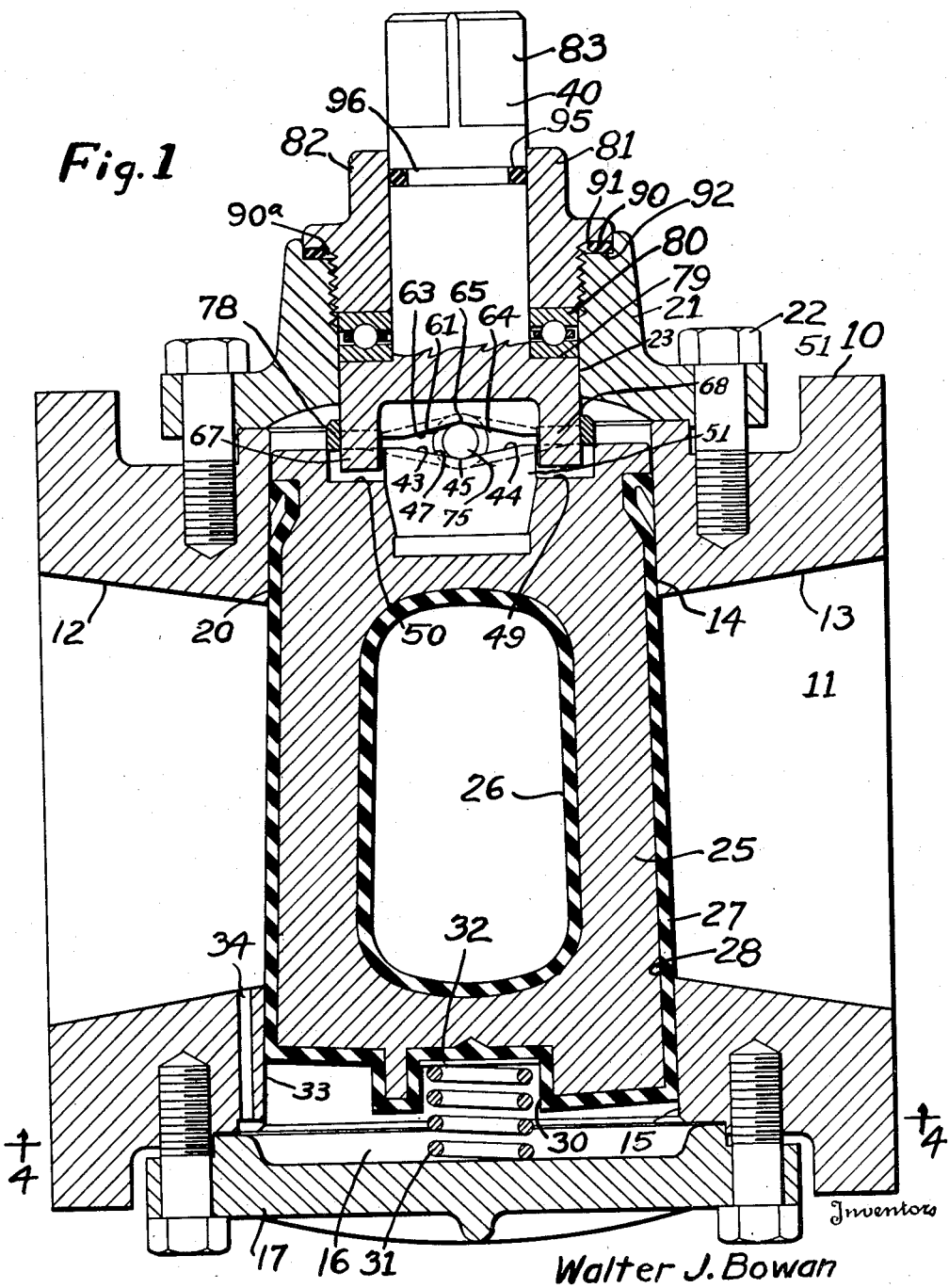

Inventor
Walter J. Bowan
Frederick Trafzik
By Cushman, Darby & Cushman
Attorneys Patented June 6, 1950

2,510,494

UNITED STATES PATENT OFFICE 2,510,494

VALVE

Walter J. Bowan and Frederick Tratzik, Decatur, Ill., assignors to Mueller Co., Decatur, Ill., a corporation of Illinois Application August 20, 1945, Serial No. 611,465

7 Claims. (Cl. 251—97.1)

The present invention relates to valves.

Objects of the invention are to provide valves which may be economically constructed, will provide an extremely efficient seal in a flow line under pressure, and which may be readily operated even when used with extremely high line pressures.

Other objects and advantages of the invention will be apparent from the following specification and accompanying drawings wherein Figure 1 is an axial section through a valve of the present invention, Figure 2 is a transverse section on the line 2—2 of Figure 3, Figure 3 is a fragmentary view of the structure shown in Figure 1 but with the plug or valve element rotated 90° from the closed position of Figure 1, viz., to open position. Figure 3 is also a section on the line 3—3 of Figure 2.

Figure 4:
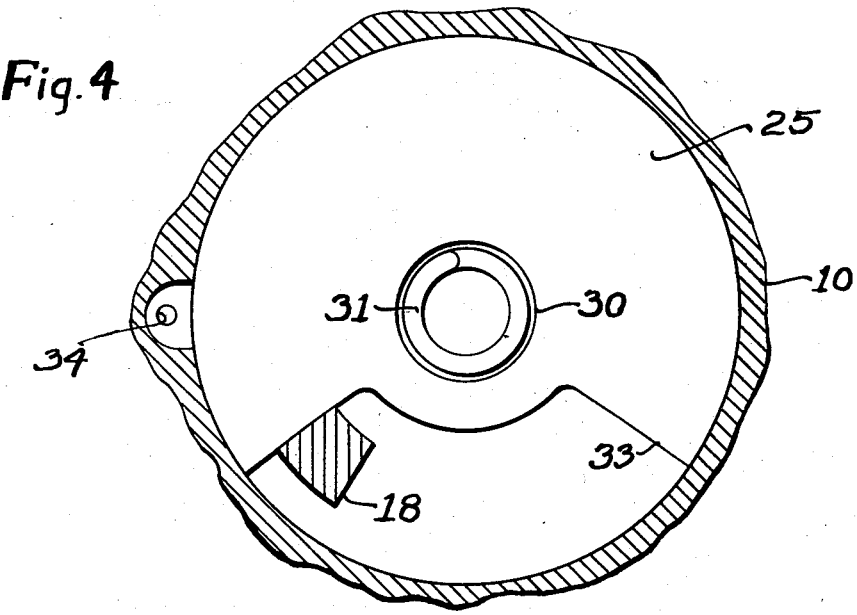
Figure 5:
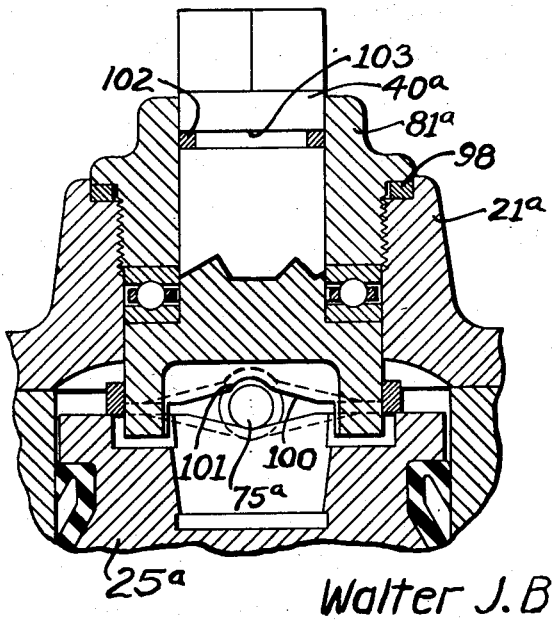

Figure 4 is a transverse section on the line 4—4 of Figure 1, but with the plug closed, and Figure 5 is a fragmentary axial section showing a modified form of operating means.

Referring to Figures 1 to 4, the numeral 10 designates the valve casing member which is provided with a flow passageway 11 including an inlet 12 and an outlet 13. A tapered valve seat bore 14 extends transversely of the flow passageway 11, the larger end 15 of the seat bore opening to a chamber 16 which is closed at its outer end by a plate or cap 17 secured in position by means of bolts as shown in Figure 1. A gasket may be provided between the plate 17 and the casing member. As is indicated in Figure 4, a stop block 18 extends upwardly from the plate 17 to limit rotation of the valve plug or element in a manner hereinafter described.

The smaller end 20 of the seat bore 14 also extends through the casing member 10 but is closed by a bossed plate 21 secured to the casing by bolts 22. Plate 21 includes a bore 23 of a smaller diameter than the smaller end 20 of the seat bore 14.

A tapered plug 25 is mounted in the seat bore 14, the plug including a flow port 26. The plug is illustrated as being provided with a layer 27 of a resilient material such as rubber applied to its seat surface 28 and also covering its larger end as well as its flow port 26. However, as is hereinafter explained, the plug need not be provided with a resilient covering. Instead, the plug may be formed entirely of metal and, in such case, either the plug or casing member seating surface, or both of them, may be provided with lubricating grooves or ports of any suitable pattern.

The larger end of the plug 25 extends into the chamber 16 at the larger end of the casing member 10 and this end of the plug includes a central socket 30. A coil spring 31 of sufficient strength to normally hold the plug seated is positioned in the socket 30, with the outer end of the spring bearing upon the plate 17. If the plug is covered with rubber or the like, a metal wear plate 32 may be positioned in the inner end of the socket 30 to provide a firm bearing for the spring 31. The larger end of the plug is also provided with an arcuate recess 33 which cooperates with the stop block 18 to limit rotation of the plug to 90°. A port 34 extends from the inlet passage 12 of the casing to the chamber 16 so that line pressure may act upon the larger end of the plug to hold it seated.

The smaller end of the plug 25 is provided with a connection which cooperates with a similar structure formed on the inner end of the operating stem 40. The operating connection on the plug includes a pair of diametrically opposite and concentric concave cam surfaces 41 and 42 each of which is of V-shaped form. The cam 41 includes an incline 43 and a second incline 44, these two inclines meeting to form the apex 45 of the cam surface. Cam surface 42 includes corresponding surfaces 43a and 44a and an apex. As best shown in Figure 3, the cam surfaces 41 and 42 are arranged at an acute angle to a radius of the plug, with their point of greatest depth distant from the axis of the plug.

The cam surfaces 41 and 42 extend through an arc of somewhat less than 60° as best shown in Figure 2 and these surfaces extend upwardly to a flat surface on the plug so that flats 48 are provided adjacent both ends of each cam surface. Between the flats 48, and midway between the cam surfaces 41 and 42, the plug is provided with recesses or pockets 49 and 50. It will be observed from Figure 2 that the cam surfaces 41 and 42 and the recesses 49 and 50 are arranged about a circular line concentric with the plug axis.

The inner edges of the cams and recesses may be defined by a central socket 51 in the plug. The recess 49 has end walls 49a and 49b while pocket 50 includes end walls 50a and 50b. These end walls preferably extend in planes which lie on the axis of the plug.

The operating stem or element 40 is equipped with two concave, arcuate and V-shaped cam surfaces 61 and 62 which will normally lie directly opposite the plug cam surfaces 41 and 42, respectively. As shown in Figure 1, the cam surface 61 includes inclines 63 and 64 which meet at an apex 65. The cam surface 62 is provided with corresponding surfaces. Flats 66 are provided with corresponding surfaces. Flats 66 are provided at the ends of the cam surfaces 61 and 62 of the operating member and projections 67 and 68 are formed intermediate the ends of these flats, the projections being adapted to extend into the pockets or recesses 49 and 50, respectively. The projection 67 includes a shoulder 67a at one end thereof and a shoulder 67b at its other end, which shoulders lie in planes which lie on the axis of the stem. The projection 68 includes corresponding shoulders 68a and 68b. It will be observed from Figures 2 and 3 that the projections 67 and 68 are of a length circumferentially of the plug which is less than the corresponding dimension of the sockets 49 and 50, respectively. In this way, the projections 67 and 68 have a loose fit with respect to the recesses circumferentially of the plug and operating element 40. It will be observed that the recesses 49 and 50 have a depth axially of the plug and the same is true of the projections 67 and 68.

A roller 75 is positioned between the cam surfaces 41 and 61 while a roller 76 is positioned between the cam surfaces 42 and 62. The rollers are of tapered formation to conform to the surfaces of the cams and are rounded at their outer ends as indicated at 77 so that they will have a single point bearing upon the inner cylindrical surface of a holding ring 78 which fits about the inner end of the operating stem or element 40. The rollers 75 and 76 are held in proper position radially of the cam surfaces by the ring 78 and, because the rollers are tapered, no other securing means is required to maintain them in position.

As shown in Figure 1, the operating stem 40 is of reduced diameter outwardly of the structure which has just been described so that a shoulder 79 is provided thereon. A roller bearing assembly 80 is positioned between this shoulder and a retainer sleeve 81. Retainer sleeve 81 is threaded in the bore 23 of the plate 21 and, at its outer end, it is provided with flat surfaces indicated at 82 adapted to be engaged by a suitable wrench. Stem 40 extends outwardly beyond the sleeve 81 and may be squared as indicated at 83 to receive an operating handle or wrench. Sleeve 81 serves to hold stem 40 against outward movement.

In operation, the plug 25 will be held firmly seated either by means of the spring 31 bearing against its larger end or by the action of flow line fluid entering the chamber 16 from the inlet side 12 of the flow passage 11. The seating pressure necessary in a large sized valve used to control high pressure markedly interferes with the rotation of the plug, regardless of whether the plug is coated with rubber as is illustrated, or includes a metal seat surface. The operating connections between the stem 83 and the plug 25 enable this resistance to operation to be readily overcome. More particularly, if the plug is in closed position as indicated in Figure 1 and is thereby urged firmly toward the smaller end of the valve body seat by the seating means, rotation of the stem 83 in a clockwise direction to rotate the plug to the position indicated in Figures 2 and 3 will result in the following action: Initial rotation of stem 83 of operating element 40 will cause the incline 63 of cam surface 61 to move to the right in Figure 1 and over the roller 75, forcing that roller along the incline 44 of cam surface 41. The diametrically opposite roller 76 will act upon in a similar manner. As a result, the plug 25 will be moved axially of the seat bore 14. When the plug has been moved axially a sufficient distance to slightly unseat it, the plug will rotate with the stem 40. If the resistance of the plug to rotation is too high to be overcome solely by the turning moment imparted by the cam surfaces with respect to the rollers, the continued rotation of stem 40 with respect to the plug will bring the end faces of the projections 67 and 68 into abutment with the opposed end walls of the pockets 49 and 50, respectively. A positive rotary drive connection will thus be set up between the operating stem 40 and the plug 25. In practice, the circumferential dimension of the pockets 49 and 50 can be so established with respect to the circumferential dimension of the projections 67 and 68 that at the time when the plug has been moved axially a sufficient distance to release it for turning, the projections will come into contact with the end walls of the recesses. That is, by properly regulating these dimensions as well as the inclination of the cam surfaces, the plug will not be unseated too far before the more positive rotational drive is imparted thereto.

It is found that the use of cooperating V-shaped cams on the operating stem 40 and the plug 25 enables the plug to be unseated more rapidly than with cam surfaces of other types. In addition, the use of projections and pockets between the cam surfaces instead of at the ends thereof insures a more positive rotating action.

If the plug is covered with resilient material as illustrated in the drawings, the cam surfaces of the plug and operating element will be so formed that their apices or median lines will be parallel to the axis of the plug flow port 26, as is also illustrated in the drawings. One purpose of this arrangement is as follows: When a rubber coated plug is closed in a high pressure line, the pressure on the inlet side 12 urges the plug toward the outlet 11, generally canting or tilting the plug with respect to the casing member seat bore axis so that the larger end of the plug would be very slightly to the right of the position shown in Figure 1. As a result, the rubber coating on the side of the plug at the outlet passageway 11 bulges somewhat into the mouth of the outlet. By the structure of the present valve, if plug 25 is canted by pressure at inlet 12 as described above, incline 44 of cam surface 41 would be tilted upwardly and to the right from the position shown in Figure 1. In such case, the initial turning of operating element 40 would cause roller 75 to bear on incline 44 to thereby move the plug to a position coaxial with the operating element 40 and casing seat bore. This movement would withdraw from the mouth of outlet 11 any rubber which has bulged into that mouth. Further rotation of stem 40 would move the plug axially to slightly unseat it, and the projections and recess walls would then contact to impart positive rotation to the plug.

It has been found that in order to insure that the plug 25 will always be firmly seated, it is necessary that the cam surfaces should not have too close a contact with the rollers 75 and 76. That is, if the operating stem 40 is positioned too far inwardly of the seat bore, the plug may not be seated firmly enough against the smaller end of the seat bore because it is held from seated position by the operating stem 40. Nevertheless, unless the holding sleeve 81 is firmly threaded into or sealed with respect to the cap plate 21, leakage can occur between sleeve 81 and cap plate 21. In order to overcome this difficulty, a sealing element 90 of the type known as an O-ring is positioned between a shoulder 91 of the sleeve 81 and an opposed shoulder 92 on the cap plate 21. O-rings are annular and endless and formed of resilient material and have the characteristic that when exposed to pressure at any point of their radial cross section, they tend to fill up the space in which they are fitted, assuming that the space is of different radial section from the O-ring.

For example, the O-ring 90 is normally round in radial section, though it is shown compressed to elliptical section by the surfaces 91 and 92. The surfaces 91 and 92 form part of an annular space 90a which is rectangular in radial section. Assuming now that pressure flows outwardly in the space 90a, i. e., along lines parallel to the surfaces 91 and 92, this pressure will act upon the inner circumferential surface of ring 90 and will flatten that surface. However, flattening of that surface will cause the ring to expand in radial section along lines normal to the direction of pressure, i. e., along lines normal to the surfaces 91 and 92. Therefore, the ring will closely engage the surfaces 91 and 92 to form a tight seal therewith.

Because of the above characteristic of the O-ring 90, the valve of Figures 1 to 4 may be installed in the following manner: When the valve has been connected in a flow line, and the plug is in closed position, the sleeve 81 may be threaded inwardly sufficiently far to bring the operating stem 40 into firm contact with the rollers 75 and 76, these rollers then being positioned at the apices of the cam surfaces. When this firm contact has been established, the O-ring 90 will be compressed to a certain extent, between the surfaces 91 and 92. However, the sleeve 81 may then be backed out, for example, by about one-quarter of a turn, so that sufficient play will be provided between the rollers and cam surfaces to insure that the operating stem cannot hold the plug from properly seated position. However, the fact that the operating stem has been backed outwardly from its most inward position will not result in a poor seal at the O-ring because such pressure as then leaks up past the threads of the sleeve 81 will act outwardly upon the O-ring 90 to expand the latter in a direction vertically of Figure 1 to thereby maintain a proper seal between plate 21 and sleeve 81.

The above stated characteristic of an O-ring will also prevent any fluid or foreign particles from reaching the interior of the valve past the sleeve 81 and will thereby prevent damage to the valve seating surfaces.

An O-ring 95 of circular shape in radial section is also provided in a groove 96 which surrounds the stem 40 inwardly of the end of the sleeve 81 and is of rectangular section. Any pressure acting between stem 40 and the sleeve 81 will cause O-ring 95 to spread horizontally as viewed in Figure 1 to thereby prevent leakage either inwardly or outwardly of the valve structure.

Figure 5 shows a modified valve structure which is identical with that disclosed in Figures 1 to 4 except that packing rings of a type other than an O-ring are used therein. In more detail, a packing ring or washer 98 is provided between the holding sleeve 81a and the cap plate 21a. In order to insure that the cam surface 100 will not hold the plug 25a slightly off its seat when the sleeve 81a is threaded far enough inwardly to establish a tight seal at the ring 98, the cam surfaces of the operating stem 40a, which cam surfaces are typified by that shown at 100, are recessed as indicated at 101 at a point intermediate their length. The recess 101 is of sufficient depth and all other dimensions are so maintained that when the sleeve 81a is in firm sealing contact with the packing 98, the roller 75a will not not be in the recess. As a result, the plug 25a is free to move axially without bringing roller 75a into contact with the outer end of recess 101. A packing ring 102 of suitable form is also provided in a groove 103 surrounding the operating stem 40a.

A set screw, not shown, will be provided in the plates 21 and 21a to hold the retainer sleeves 81 and 81a, respectively, in adjusted position.

The terminology used in the specification is for the purpose of description and not of limitation, the scope of the invention being indicated in the claims.

We claim:

1. In a valve, a casing member provided with a flow passageway and a seat bore extending transversely of the flow passageway, a valve element including a flow-port rotatably mounted in the seat bore, means to urge the valve element toward one end of the seat bore, a valve operating element at said end of the seat bore and rotatable in the casing member about the axis of the seat bore, the inner end of said operating element being opposite the adjacent end of the valve element, the opposed ends of said elements being provided with cooperating means to move the valve element axially of the seat bore and rotate the valve element in the seat bore comprising circumferentially extending concave V-shaped cam surfaces, and, circumferentially between said surfaces, one element being provided with an axially extending recess and the other element being provided with a projection extending axially into the recess, the projection being of less circumferential extent than the recess, rollers between said cam surfaces, and means carried by said casing member to hold said operating element against movement outwardly with respect to said casing member.

2. A valve of the character defined in claim 1 wherein two diametrically opposite cam surfaces are provided on each element.

3. A valve of the character defined in claim 1 wherein two diametrically opposite cam surfaces are provided on each element and a line radially intersecting both surfaces on the valve element is parallel to the axis of the valve element flow port.

4. A valve of the character defined in claim 1 wherein each cam surface of one of said elements includes a pocket at its apex.

5. A valve of the character defined in claim 1 wherein the casing member seat bore and valve element are tapered and the operating element is at the smaller end of the valve element.

6. A valve of the character defined in claim 1 wherein a ring member surrounds the operating element and rollers.

7. A valve of the character defined in claim 1 wherein the cam surfaces are inclined so as to diverge toward their outer circumferential edges, said rollers are correspondingly tapered and have their outer ends rounded, and a ring including a cylindrical inner surface encircles the outer ends of the rollers.

WALTER J. BOWAN.
FREDERICK TRATZIK.

REFERENCES CITED

The following references are of record in the file of this patent:

UNITED STATES PATENTS

| Number | Name | Date |
|---|---|---|
| 2,179,684 | Brown | Nov. 14, 1939 |
| 2,222,626 | Mueller | Nov. 26, 1940 |
| 2,285,221 | Mueller | June 2, 1942 |
| 2,298,036 | Cohen | Oct. 6, 1942 |
| 2,308,300 | Parker | Jan. 12, 1943 |

FOREIGN PATENTS

| Number | Country | Date |
|---|---|---|
| 516,614 | Great Britain | of 1939 |